Jan. 13, 1942.    J. NAAB    2,269,680
CROSSHEAD
Filed April 15, 1938    2 Sheets-Sheet 1
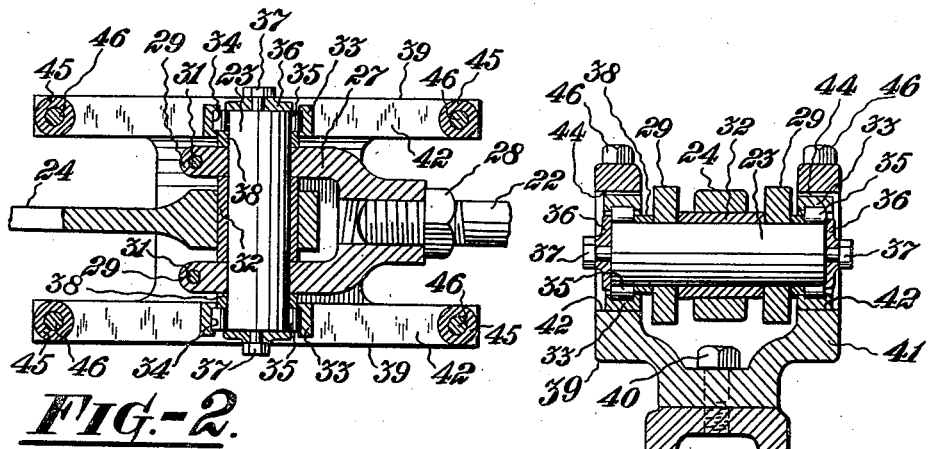
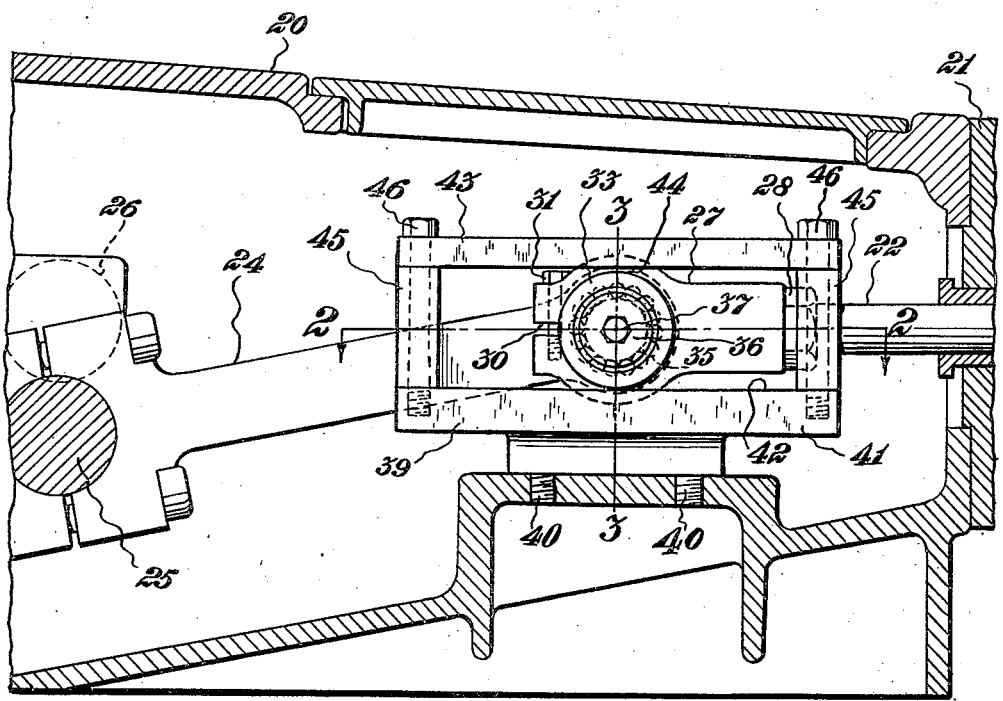
INVENTOR
Julius Naab.
BY
HIS ATTORNEY.

Jan. 13, 1942.   J. NAAB   2,269,680
CROSSHEAD
Filed April 15, 1938   2 Sheets-Sheet 2
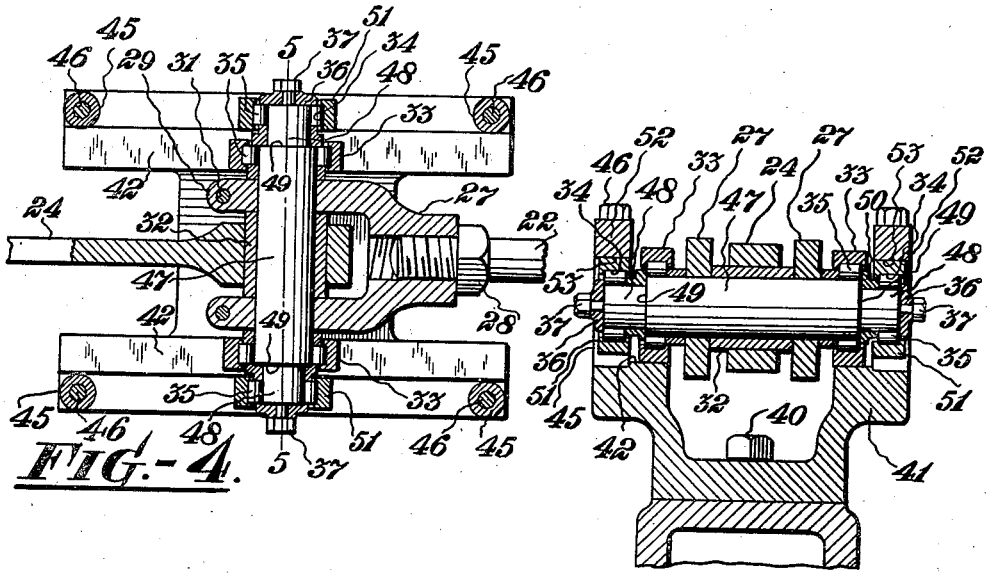
FIG.-4.
FIG.-5.
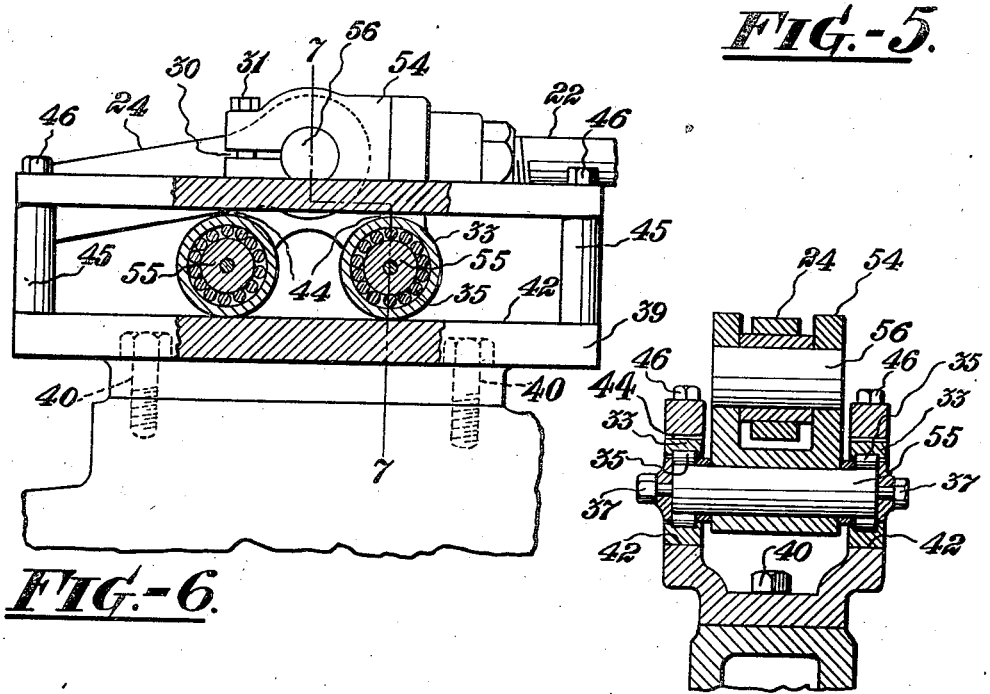
FIG.-6.
FIG.-7.
INVENTOR
Julius Naab.
BY
HIS ATTORNEY.

Patented Jan. 13, 1942

2,269,680

UNITED STATES PATENT OFFICE 2,269,680

CROSSHEAD

Julius Naab, Easton, Pa., assignor to Ingersoll-Rand Company, Jersey City, N. J., a corporation of New Jersey Application April 15, 1938, Serial No. 202,149

4 Claims. (Cl. 308—6)

This invention relates to compressors, and more particularly to a crosshead for compressors, engines and the like.

One object of the invention is to minimize friction between the crosshead and its guide or support.

Another object is to simplify the crosshead structure.

A further object is to render the crosshead structure readily accessible for inspections and repairs.

Still another object is to prolong the life of the parts constituting the crosshead structure.

Other objects will be in part obvious and in part pointed out hereinafter.

In the drawings accompanying this specification and in which similar reference numerals refer to similar parts, Figure 1 is a longitudinal elevation, partly in section, of a compressor equipped with a crosshead constructed in accordance with the practice of the invention, Figure 2 is a plan view, partly in section, taken through Figure 1 on the line 2—2, Figure 3 is an elevation, in section, taken on the line 3—3 of Figure 1, Figure 4 is a view similar to Figure 2 showing a modified form of the invention, Figure 5 is a transverse view taken through Figure 4 on the line 5—5, Figure 6 is a longitudinal elevation, partly in section, showing still another modified form of the invention, and Figure 7 is a transverse view taken through Figure 6 on the line 7—7.

Referring to the drawings, and at first more particularly to the form of the invention illustrated in Figures 1 to 3 inclusive, 20 designates a portion of the main frame of a compressor or engine and 21 the end wall of a cylinder which may be secured to the main frame in any suitable manner. The cylinder 21 may encase a piston (not shown) having a rod 22 which is connected, by a wrist pin 23, to a connecting rod 24 connected to the pin 25 of a crank shaft 26 in the main frame 20.

The wrist pin 23 is arranged in a clevis 27 threaded on the end of the piston rod 22 and locked in position by a lock nut 28. The wrist pin has a snug fit in the clevis 27 and the arms 29 of said clevis are provided with slots 30 which extend from the free ends of said arms and open into the bores in the arms containing the wrist pin 23. Screws 31 arranged in the arms 29 serve to draw the portions of the arms lying on opposite sides of the slots together for clamping said arms firmly to the wrist pin 23.

The arms 29 of the clevis are suitably spaced to permit the arrangement of the end of the connecting rod 24 therebetween, and a bushing 32 abutting the inner surfaces of the arms 29 is arranged on the wrist pin 23 to provide a renewable wearing surface for the connecting rod 24.

In accordance with the practice of the invention, the wrist pin ends project exteriorly of the clevis 27 and on each end thereof is arranged a roller sleeve 33 having an internal guideway 34 for anti-friction elements shown, in the present instance, as rollers 35 which bear upon the periphery of the wrist pin 23. The guideway 34 lies intermediate the ends of the roller sleeve 33 and as a consequence the rollers 35 are interlocked against endwise movement with respect to the roller sleeve 33.

In order to retain the roller sleeve 33 and the rollers 35 upon the wrist pin 23 plates 36 are arranged on the ends of the wrist pin and are of such diameters as to partly overlie the outer ends of the rollers 35. The plates 36 may be secured to the wrist pin in any suitable manner, as for example by screws 37 extending through said plates and threaded into the wrist pin. Suitable spacers 38 in the form of rings may be interposed between the outer surfaces of the arms 29 of the clevis and the rollers 35 to prevent endwise movement of said rollers and the roller sleeve in the direction of the clevis.

The connected ends of the rods 22 and 24 are supported by a frame 39 which is seated upon and secured to the main frame 20 by bolts 40. The frame 39 comprises a base member 41 having a pair of bearing surfaces 42 upon which the roller sleeves 33 roll to support the weight of the crosshead structure. In order to avoid deflection of the free end of the piston rod 22 upon the application of a thrust thereto by the connecting rod 24 a guide member 43 is arranged above and in parallelism with each bearing surface 42.

The guide members 43 are so positioned that clearance 44 will exist between them and the roller sleeves so that during the normal operation of the rods 22 and 24 and during which time the roller sleeves will bear upon the surfaces 42 the roller sleeves will be out of contact with the guide members 43. The spaces 44 are, however, so small that only a very slight degree of deflection in an upwardly direction of the piston rod 22 is required to bring the roller sleeves into contact with them.

The guide members are held in the position described by spacers 45 interposed between the bearing surfaces 42 and the guide members and are secured to the base member 41 by bolts 46 extending through the guide members and the spacers and threaded into the base member 41.

In the form of the invention illustrated in Figures 4 and 5 the wrist pin, designated 47, has reduced ends 48 and shoulders 49, at the junctures of the ends 48 and the body portion of the wrist pin, against which seat plates 50 that act as abutments for the outer ends of the rollers 35. On the portions of the ends 48 lying exteriorly of the plates 50 are additional roller assemblies comprising roller sleeves 51 which are in all essential respects similar to the roller sleeves 33, although preferably of smaller diameter. Each sleeve 51 has an internal guideway 34 for the accommodation of anti-friction rollers 35 which bear directly upon the periphery of the ends 48 of the wrist pin, and on each end of the wrist pin is arranged a plate 36 which overlies portions of the ends of the outermost rollers 35 and are secured to the wrist pin by screws 37.

In this form of the invention separate bearing surfaces are provided for each roller sleeve. Thus, as in the form of the invention previously described, bearing surfaces 42 are provided on the upper surface of the base member 41 for the roller sleeves 33, and off-set with respect to the bearing surfaces 42 and overlying the roller sleeves 51 are guide members 52 of which the lowermost surfaces 53 serve as bearing surfaces for the roller sleeves 51. The latter roller sleeves are in constant contact with the bearing surfaces 53 but do not contact the base member 41.

The guide members 52, in this instance, are also supported and held in correct relationship with the base member 41 by spacers 45 and bolts 46 which secure the guide members 52 and the spacers to the base member.

The form of the invention illustrated in Figures 6 and 7 embodies a frame 39 similar in all essential respects to that shown in Figure 1 but differs from the previously described structures in that the clevis, designated 54, is provided on its lowermost portion with a pair of shafts 55. The ends of the shafts extend from opposite sides of the clevis to accommodate the roller sleeves 33, thus providing two complete roller units on each side of the clevis to engage the bearing surfaces 42. In this arrangement the wrist pin, designated 56, terminates flush with the outer sides of the clevis 54 and is clamped securely to the clevis by means of the bolts 31.

I claim:

1. A device of the character described, comprising a crosshead having two arms, a wrist pin to extend through and beyond said arms, inner and outer anti-friction rollers on each end of the wrist pin beyond said arms, bearings between the inner rollers and the arms, plates to separate the inner and outer rollers, securing plates abutting against the outer rollers to retain said rollers on the wrist pin, screws to secure said securing plates to the wrist pin, and support means for the crosshead having pairs of opposed guide surfaces on opposite sides of the crosshead to engage said rollers.

2. A device of the character described, comprising a crosshead having two arms, a wrist pin to extend through and beyond said arms, inner and outer anti-friction rollers on each end of the wrist pin beyond said arms, bearings between the inner rollers and the arms, plates to separate the inner and outer rollers, securing plates abutting against the outer rollers to retain said rollers on the wrist pin, screws to secure said securing plates to the wrist pin, and support means for the crosshead having pairs of opposed guide surfaces on opposite sides of the crosshead and the guide surfaces of each pair being off-set with respect to each other whereby the inner rollers may engage one pair of guide surfaces and the outer rollers may engage the remaining pair of guide surfaces.

3. A device of the character described, comprising a crosshead having a pair of arms, a wrist pin to extend through and beyond said arms, at least one roller rotatable on each end of the wrist pin and extending beyond the arms, anti-friction elements within the rollers seating upon the wrist pin, rings on the wrist pin interposed between the crosshead and the anti-friction elements to hold the anti-friction elements in spaced relation with respect to the crosshead, plates overlying portions of the ends of the anti-friction elements to retain the rollers on the wrist pin, screws to secure the plates to the wrist pin, and a support having guide ways for the rollers.

4. A device of the character described, comprising a crosshead, a wrist pin extending through and beyond the opposite sides of said crosshead, inner and outer anti-friction rollers on each end of the wrist pin beyond the crosshead, bearings between the inner rollers and the cross-head, plates to separate the inner and outer rollers, retaining plates abutting against the outer rollers to maintain said rollers on the wrist pin, screws to secure said retaining plates to the wrist pin, and a support having guide ways for each roller.

JULIUS NAAB.